United States Patent [19]

Szabados, nee Borbas

[11] 3,815,175

[45] June 11, 1974

[54] KITCHEN UTENSILS WITH REMOVABLE GRIPS

[76] Inventor: Lydia Szabados, nee Borbas, Residence Trocedero Parly 2 - 10 Square Poussin, Le Chesnay (Yvelines), France

[22] Filed: Apr. 3, 1972

[21] Appl. No.: 240,357

[30] Foreign Application Priority Data

Apr. 26, 1971  France .............................. 71.14823

[52] U.S. Cl. .............................................. 16/114
[51] Int. Cl. .......................................... A47b 95/02
[58] Field of Search ................ 16/110 A, 110, 114; 220/94

[56] References Cited
UNITED STATES PATENTS

| 602,324 | 4/1898 | Hautsch ........................... 16/114 A |
| 1,423,406 | 7/1922 | Donley ............................. 16/114 A |
| 3,342,517 | 9/1967 | Pryce ................................ 220/94 R |

FOREIGN PATENTS OR APPLICATIONS

| 313,835 | 6/1929 | Great Britain .................... 16/114 A |

*Primary Examiner*—Bobby R. Gay
*Assistant Examiner*—Doris L. Troutman
*Attorney, Agent, or Firm*—Young & Thompson

[57] ABSTRACT

A removal grip capable of cooperating with lugs or knobs mounted on kitchen utensils, other vessels or their lids. The removable grip comprises one part forming the grip proper provided at its extremity with a small plate having a cut-out of an arc of a circle with in the convex part of this cut-out at least one notch shaped as an arc of a circle with on at least one side of the plate, at least one support point placed in the surface, perpendicular to the plate having as directrix the edge of the cut-out directed towards the grip part, the lugs or knobs fixed on the utensil or its lid having one part in a cylindrical sector capable of being adapted to the cut-out of the small plate by making it project sufficiently beyond the said cut-out to come to gain support against the said support point, this part in cylindrical sector comprising on its concave face at least one truncated rib capable of fitting into the notch or the notches of the arc of the circle of the small plate of the grip.

11 Claims, 6 Drawing Figures

PATENTED JUN 11 1974 3,815,175
SHEET 2 OF 2
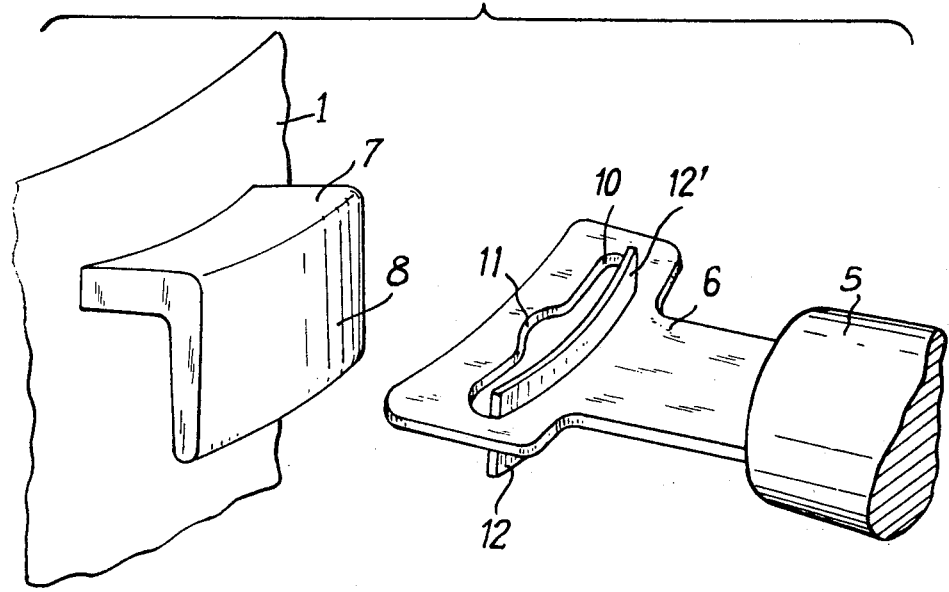
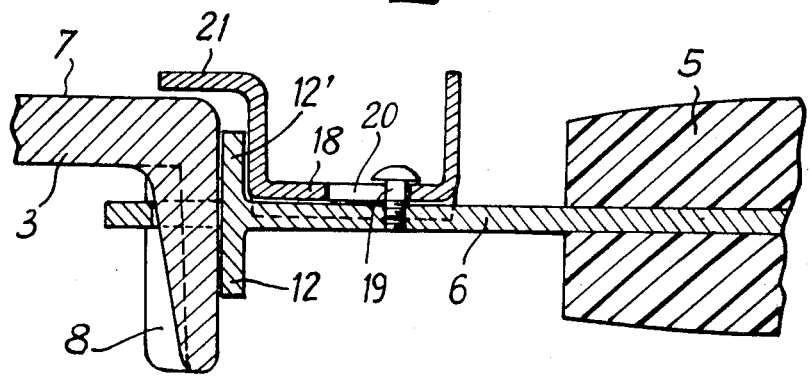

KITCHEN UTENSILS WITH REMOVABLE GRIPS

The present invention relates to kitchen utensils provided with removable grips.

Numerous devices have already been proposed to equip vessels, constituting mainly, but not exclusively, kitchen utensils, with removable handles, grips or holders. The specific aim of this arrangement is to be able to remove the handle from these vessels when the latter have to be placed in an oven in such a manner as to reduce the area occupied and to prevent the thermal insulating material enclosing the handle from being damaged by the heat of the oven. These arrangements comprise mechanical interlocking means which are rather complex from which fact results inevitably the obligatory presence on the vessel itself of hooking pieces in such a form having various cavities the cleaning of which is difficult. In addition these interlocking means are injurious to the exterior appearance of the vessel which is a disadvantage in the case of souffles moulds, stew-pans, saute pans and the like which must be capable of being placed on the table. Likewise it is useful to be able to handle the lids of these vessels with a removable grip.

The aim of the present invention is to provide a removable grip capable of co-operating with lugs or knobs mounted on the vessels or their lids.

In accordance with the invention, the removable grip comprises one part forming the grip proper provided at its extremity with a small plate having a cut-out of an arc of a circle with, in the convex part of this cut-out, at least one notch shaped as an arc of a circle with, on at least one side of the plate, at least one support point placed in the surface, perpendicular to the plate having as directrix the edge of the cut-out directed towards the grip part, the lugs or knobs fixed on the utensil or its lid having one part in a cylindrical sector capable of being adapted to the cut-out of the small plate by making it project sufficiently beyond the said cut-out to come to gain support against the said support point, this part in cylindrical sector comprising on its concave face at least one truncated rib capable of fitting into the notch or the notches of the arc of the circle of the small plate of the grip.

It has been found that, in an astonishing manner, such a movable grip of simple construction co-operating with lugs or knobs also of simple shape permitted one to manipulate perfectly a vessel or a lid and to tip the vessel to pour out its contents.

Fittings of the corner type are already known but in these the male and female parts interlock surface against surface over a rather large width and the disengagement of such an attachment necessitates considerable effort which would render difficult the withdrawal of the grip. In the present invention, it is the rocking couple absorbed in the front edge the cut-out opposite the part forming the grip and the support point situated opposite the said edge which ensures the maintenance in the relative position, the centring and the interlocking being ensured by the engagement of the truncated rib in the notch of the plate of the grip. It is therefore sufficient to cancel this couple to be able to remove the grip.

It is obvious that by virtue of the mode of action the plate must be substantially perpendicular to the surface of the lug or of the knob with which it co-operates. The grip having to be substantially horizontal to permit normal gripping, the plate is perpendicular to the general direction of the grip when the surface of the lug or of the knob is horizontal and in the extension of this direction when the surface of the lug is vertical.

Generally the support point is constituted by a surface perpendicular to the plate and having the edge of the cut-out as directrix, it can be provided on one single face of the plate but it is preferable to provide it on both faces.

Although this is not generally necessary, there may also be provided a keying-in by means of a retractable spur or the like co-operating with a cavity in the external cylindrical surface of the lug or of the knob or with a surface perpendicular to the external cylindrical surface of the lug.

The subject of the invention is on the one hand the grips themselves and on the other hand vessels and lids provided with lugs and knobs in accordance with the invention, and finally lugs and knobs capable of being attached to vessels or covers characterized in that they comprise one part in cylindrical sector with the smooth cylindrical external face and on the concave face of this part, at least one truncated rib disposed in accordance with a generatrix.

Other objects, features and advantages of the invention will become apparent from a consideration of the following description taken in connection with the accompanying drawings in which:

FIG. 3 is a perspective view of the corresponding extremity of the grip;

FIG. 6 is a view in longitudinal section of a movable holder in accordance with the invention provided with a blocking member.

Figure 1:
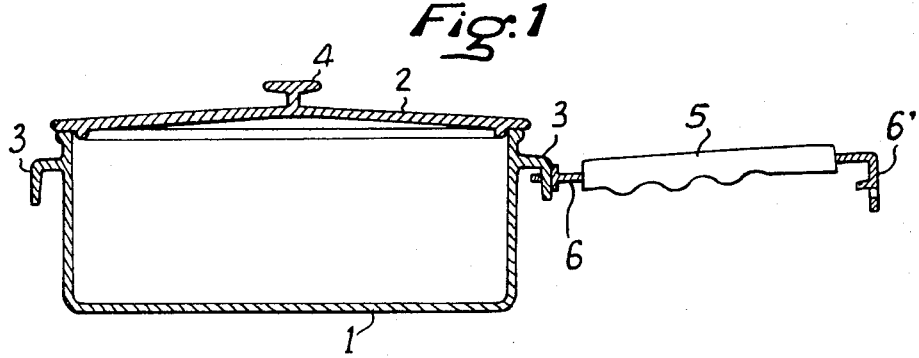
FIG. 1 is a schematic sectional view, through the vertical plane passing through the grip, of a vessel in accordance with the invention provided with a lid and a grip or holder in accordance with the invention.

In FIG. 1, the vessel 1 is of the stew-pan type and includes a lid 2. It is provided with two lugs 3 of inverted L-section which will be described in more detail hereinafter. The vessel can be of cast iron, beaten sheet steel, aluminium, glass, porcelain, stoneware, etc., the lugs can be in the same material and be integral with the mass of the vessel or be made of another material and be attached by any of the known methods. The lid 2 includes a knob 4 which will be described in detail hereinafter. This knob 4 can also be integral with the body of the lid or be attached. As will become apparent from the description the positions and types of the lugs and knobs could be modified without departing from the scope of the invention. It is thus particularly that the vessel could comprise a single lug or more than two lugs and that the latter instead of the inverted L-section could be made up by a horizontal piece of cylindrical sector as will be explained hereinafter for the knob although such a construction would complicate the manufacturing process. Likewise the knob 4 which has a T-shape could be replaced by lugs of L-section having a horizontal branch of cylindrical sector spread over the periphery of the lid.

The removable grip or holder consists of a grip proper 5 made of any sort of material, particularly of wood, plastics or of ceramics which carries at least one of its extremities a plate 6 intended to co-operate with the lug or the knob in accordance with the invention and which will be described in more detail hereinafter. In fact when the handle is intended to co-operate with the parts of cylindrical sector of lugs and of knobs which are vertical and horizontal as in FIG. 1, it comprises a plate 6 which is plane and a plate 6' of L-shaped section so that the grip 5 is horizontal in the interlocking position.

Figure 2:
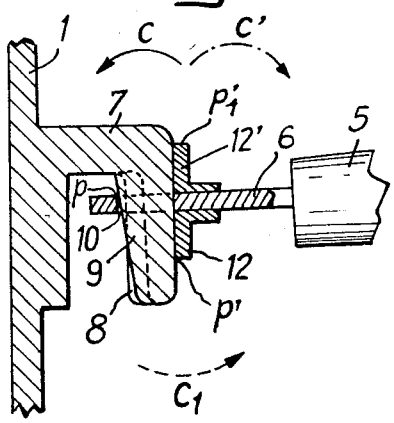
FIG. 2 is a detailed view in section illustrating the interlocking of the movable holder on one lug in accordance with the invention.

In the form of embodiment of the lug 3 shown in detail in FIGS. 2 and 3, the lug includes a horizontal part 7 and a vertical skirt 8, which skirt is in the cylindrical sector to follow the body shape of the vessel, its thickness being capable of decreasing slightly towards its free edge to facilitate the interlocking in the cut-out of the plate. At the centre of the concave face of the part in cylindrical sector is made a truncated fin 9 the role of which will appear hereinafter. The plate 6 at the extremity of the grip 5, comprises a cut-out 10 in arc of a circle the shape and width of which are such that it can interlock with the skirt 8 of the lug. A cut-out in the shape of an arc of a circle 11 is provided in the convex part of the cut-out to ensure the interlocking of the truncated rib 9. On the two faces of this plate 6 are attached two angled pieces 12, 12' whose face perpendicular to the plate follows the peripheral surface of the skirt 8 on at least one part of its development. It will be understood according to the explanations hereinbelow that the pieces 12—12' could have other shapes on condition they make at least one support point for the exterior face of the skirt 8 at a certain distance from the surface of the plate 6 but it is generally preferable to have a line of contact to ensure the best stability.

If, using the grip 5, the vessel is raised, the weight of the latter exerts on the joint a couple C which is equilibrated by a couple C' exerted on the grip. In the joint, these two couples are translated by pressures forces $p$ and $p'$ on the front edge of the cut-out 10 and at the extremity of the piece 12 respectively. The weight of the vessel tends to push the skirt 8 down further into the cut-out 10. One can therefore lift the vessel. If the vessel is put down the couple C disappears and the couple C' becomes weaker since there is now only the weight of the grip. The forces $p$ and $p'$ are reduced but experience shows that the frictional components remain sufficient to maintain the grip in place. If, the vessel 1 being raised, it is returned, the couple C becomes a couple $C_1$ in the opposite sense to which a couple $C'_1$ is opposed (not shown) of the opposite sense. These two couples give a pressure force $p$ on the front edge of the cut-out 10 and a pressure force $p'1$ on the extremity of the piece 12'. In spite of the fact, in this case, that the weight of the vessel tends to extract the lug 8 from the cut-out 10, experience has shown that the frictional components are sufficient to prevent any disengagement. In the intermediary positions particularly during pouring the composition of the forces is more complex but even without the piece 12' it is possible to pour the contents of the vessel 1 and possibly to return it without risking any detachment. To withdraw the handle, when the vessel is put down, it is sufficient to relieve the joint of the weight of the grip and to exert a slight push towards the bottom of the latter.

Figure 4:
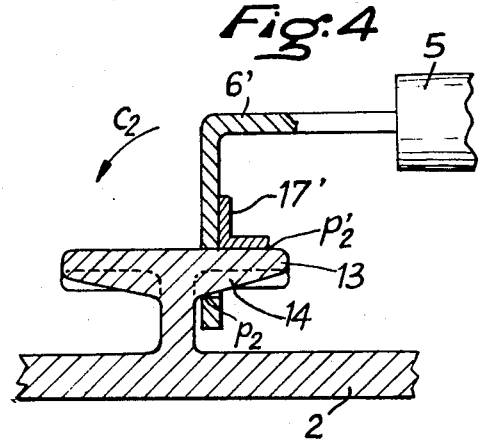
FIG. 4 is a detailed view in section illustrating the interlocking of the movable holder or grip on a knob in accordance with the invention.
Figure 5:
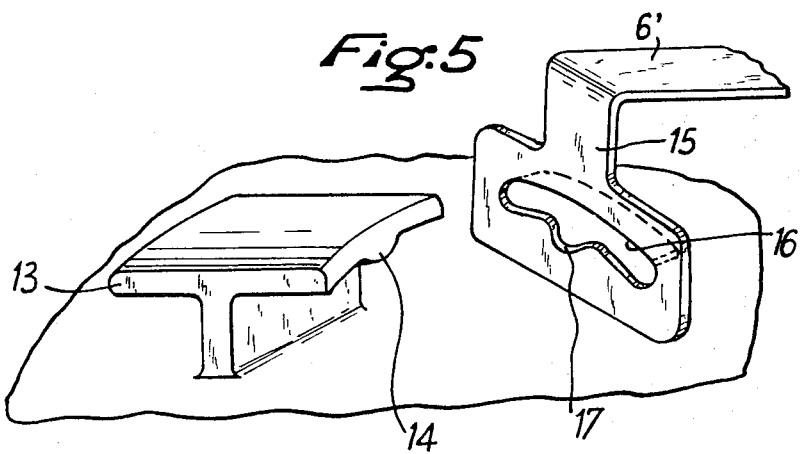
FIG. 5 is a perspective view of a form of embodiment of the knob shown in FIG. 4 and of the extremity of the corresponding grip.

As illustrated in FIGS. 4 and 5, the knob 4 has a T-section with the core fixed on the lid 2, the two horizontal fins 13 having a section in cylindrical sector. As in the case of the lug a truncated rib 14 is made on the lower concave face of each wing 13. The plate 6' at the extremity of the grip 5 is bent back to present a part 15 substantially perpendicular to the axis of the grip and in this part 15 is made a cut-out 16 capable of interlocking the wing 13. This cut-out 16 also has at the centre of its convex part, a cut-out in an arc of a circle 17 to lock the rib 14. On the face, turned towards the grip, of the part 15 is fixed a piece 17' similar to pieces 12 and 12' above. When the lid is raised with one of the wings 13 engaged in the cut-out 16, the weight of the latter produces by virtue of the unkeying of the part 15 of plate 6' with respect to the plane of symmetry, a couple $C_2$ compensated by a couple of the opposite sense on the grip. The forces $p2$ and $p'2$ which result therefrom on the lower edge of the cut-out 16 and on the rear edge of the piece 17' ensure a sufficient stability of the joint so that the cover does not risk falling. The grip 5 also remains in place under its own weight and it is sufficient to disengage it lightly to be able to withdraw it.

The form of embodiment of FIG. 6 is similar to that above described with reference to FIGS. 2 and 3. One piece 18 is nevertheless mounted slidingly on the plate 6 for example by a screwhead 19 engaged in a window 20 of the core of the piece 18 which has a U-section to be guided on the rod of the plate 6. This piece 18 has at its extremity a lug 21 which can be taken below the part 7 of the lug 3, the assembly is thus mechanically immobilized.

From a consideration of the foregoing disclosure, therefore, it will be evident that the initially recited object of the invention has been achieved.

Although the present invention has been described and illustrated in connection with preferred embodiments, it is to be understood that modifications and variations may be resorted to without departing from the spirit of the invention as those skilled in this art will readily understand. Said modifications and variations are considered to be within the perview and scope of the present invention as defined by the appended claims.

What is claimed is:

1. A kitchen utensil having handling means thereon, and a removable grip detachably engageable with said handling means to lift said utensil, said grip including an elongated handle having at at least one end thereof a plate having an elongated slot cut out therefrom, said slot having a convex side and a concave side, said convex side of said slot having at least one notch therein, a support on the edge of said slot which is adjacent said handle, said support having a surface perpendicular to the plate and of the same shape as said adjacent edge, said handling means being insertable in and removable from said slot and having at least one rib thereon that fits in said at least one notch.

2. A kitchen utensil as claimed in claim 1, said slot being arcuate.

3. A kitchen utensil as claimed in claim 2, said slot being part circular.

4. A kitchen utensil as claimed in claim 3, said notch being circular.

5. A kitchen utensil as claimed in claim 1, said notch being circular.

6. A kitchen utensil as claimed in claim 1, said plate being disposed in a plane parallel to the lengthwise extent of said handle.

7. A kitchen utensil as claimed in claim 1, said plate being disposed in a plane perpendicular to the lengthwise extent of said handle.

8. A kitchen utensil as claimed in claim 1, and retractable locking means carried by said grip and engageable with a surface of said handling means which is perpendicular to the surface of said handling means that contacts said support.

9. A kitchen utensil as claimed in claim 1, said slot being closed at both ends.

10. A kitchen utensil as claimed in claim 1, said slot being convex in the direction of said handle.

11. A kitchen utensil as claimed in claim 1, said handling means extending through said slot a distance sufficient to bear against said support a substantial distance from said plate when said utensil is supported by said grip.

* * * * *